(12) United States Patent
Suyehira

(10) Patent No.: US 6,947,161 B2
(45) Date of Patent: Sep. 20, 2005

US006947161B2

(54) SYSTEMS AND METHODS FOR AUTOMATIC STATUS TRACKING OF AUTOMATICALLY ORDERED REPLACEABLE COMPONENTS FOR PRINTING DEVICES

(75) Inventor: Richard Suyehira, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1009 days.

(21) Appl. No.: 09/859,569

(22) Filed: May 16, 2001

(65) Prior Publication Data

US 2002/0172520 A1 Nov. 21, 2002

(51) Int. Cl.⁷ .......................... B41B 19/00; B41F 19/00; G06F 15/00; G06K 1/00
(52) U.S. Cl. .......................... 358/1.15; 358/1.9; 714/47; 705/28
(58) Field of Search .......................... 358/1.15; 714/47; 705/28

(56) References Cited

U.S. PATENT DOCUMENTS

| | | | |
|---|---|---|---|
| 5,233,533 A | | 8/1993 | Edstrom et al. |
| 5,712,989 A | * | 1/1998 | Johnson et al. ............... 705/28 |
| 5,809,479 A | * | 9/1998 | Martin et al. .................. 705/11 |
| 6,028,674 A | | 2/2000 | Tognazzini |
| 6,115,641 A | | 9/2000 | Brown et al. |
| 6,430,711 B1 | * | 8/2002 | Sekizawa ..................... 714/47 |

FOREIGN PATENT DOCUMENTS

| | | |
|---|---|---|
| EP | 0306965 | 5/1989 |
| EP | 1011061 A2 | 6/2000 |
| JP | 2001034685 | 2/2001 |
| JP | 2001038986 | 2/2001 |
| WO | WO0167356 A1 | 9/2001 |

OTHER PUBLICATIONS

Examination Report for GB Application No. 0210011.3.
http://www.cartpro.com/cprofeat.html#supplytracking (see 'Cartridge to Cusstomer Tracking Features').
http://www.hp-go-supplies.com/english/did_you_know/sps_cartridge.pdf (see whole document).

* cited by examiner

Primary Examiner—Edward Coles
Assistant Examiner—Yixing Qin

(57) ABSTRACT

A printing device component is configured to automatically order a replacement component when a signal indicates that the component is nearing the end of its functional life cycle. The printing device includes an order tracker which is configured to receive and process order tracking information regarding the status of the component order. If the component is not received on or before an expected receipt date, a warning message is generated to allow appropriate action to avoid printing device down time. If the component is unavailable for shipment or must be backordered, a warning message is generated. When the component is received, the order tracking subsystem is provided with a received date. The order tracking information is stored in an order tracking database. Database records involving received items may be purged or archived for later reference.

25 Claims, 3 Drawing Sheets

| | 216 | 218 | 220 | 222 | 224 | 226 | 228 | 230 | 232 | 234 |
|---|---|---|---|---|---|---|---|---|---|---|
| | ORDER # | ORDER DATE | ITEM | ITEM # | PRINTER | LOCATION | SHIPPED DATE | RECEIVED DATE | OTHER | EXP. REC. DATE |
| 202 | 142976 | 12/10/2000 | TONER CARTRIDGE | HP4500L | PER03L | PERSONNEL | 12/11/2000 | 12/15/2000 | | 12/20/2000 |
| 204 | 142977 | 12/12/2000 | DRUM | HPLJ5L | ADMIN01L | BLDG. A, FLOOR 1 | | | BACKORDER 12/20/2000 | 12/22/2000 |
| 206 | | | | | | | | | | |
| 208 | | | | | | | | | | |
| 210 | | | | | | | | | | |
| 212 | | | | | | | | | | |
| 214 | | | | | | | | | | |

ORDER TRACKING DATABASE
132

Fig. 2

SYSTEMS AND METHODS FOR AUTOMATIC STATUS TRACKING OF AUTOMATICALLY ORDERED REPLACEABLE COMPONENTS FOR PRINTING DEVICES

TECHNICAL FIELD

This invention generally relates to printing devices having replaceable components, and more particularly, to printing devices having the capability to automatically track the status of one or more replaceable components automatically ordered by the printing device to replace a replaceable component in the printing device.

BACKGROUND

Most types of printing devices are equipped with replaceable components that have a life cycle during which the replaceable components are functional. At the end of the life cycle of a replaceable component, the component must be replaced for the printing device to continue to function properly.

For example, a toner cartridge is installed in a laser printer to provide toner for the printing process. As documents are printed, the toner supply is gradually depleted. When the toner supply is completely exhausted, the printer cannot print any further documents until the toner cartridge is replaced.

Unless a printer user has prepared in advance and has procured a new toner cartridge, then a problem arises when the toner cartridge runs out of toner and the user must delay completion of the print job. On the other hand, a user of multiple printers such as a business must keep an inventory of toner cartridges so an operational toner cartridge is always available. Having to keep such an inventory of toner cartridges imposes a financial burden on a business and utilizes valuable human resource time dealing with inventory control.

Most printers signal a user when a toner cartridge is nearing the end of its functional life cycle. The user then has time to procure a new toner cartridge before his current toner cartridge runs out of toner. Typically, this signal is in the form of a 'toner low' signal wherein a message is displayed to the user indicating that the toner supply is running low. Unfortunately, many users disregard this signal and continue to print from the toner cartridge without procuring a new toner cartridge.

Printing devices with automatic ordering functionality for replaceable components have been developed to take advantage of the time period between a signal that indicates a replaceable component is nearing the end of its life cycle and the end of the component's life cycle. In such systems, when an end-of-life signal is detected, a replacement component is automatically ordered for delivery to the location of the printing device. As a result, a replacement component is available when needed, but an expensive inventory of replacement components does not need to be on hand to prevent printing device down time.

There is a problem with such systems, however, in that once the automatic ordering system places the order, no further information is tracked for the order. Therefore, no provisions are made for instances when a component is unavailable or backordered, when an ordered component is not delivered before it is required, when a component is delivered to the company but does not get delivered to the location of the printing device, etc. As a result, a replacement component may not be available when it is required by a printing device and the printing device may incur undesirable down time.

SUMMARY

Systems and methods are described herein for enabling a printing device with the capability to automatically receive tracking information about a replacement component that was automatically ordered by the printing device or related system to replace a replaceable component in the printing device.

A printing device has an automatic ordering subsystem that is activated when a replaceable component in the printing device requires replacement, such as when the component is nearing the end of its functional life cycle. For example, a laser printer is described that utilizes a toner cartridge from which toner is depleted as print jobs are printed. When the toner supply is reduced to a certain level, a detector activates a toner low signal that signals the automatic ordering subsystem to place an order for a replacement component.

The printing device also has an automatic order tracking subsystem that receives and processes order tracking information regarding the status of the order. The order tracking information may contain information about the component only, or it may contain information about an order of several items, one of which is the ordered component. If the information is about an order of several items, then the order tracking information specifies the particular component by item number or some other manner.

The printing device includes memory in which an order tracking database is stored. The order tracking database contains a record for each ordered component. A record for an ordered component includes an order number, order date, item number, item description, printer name and printer location. Each record may also store a date on which the component was shipped, a date on which the component was received, other information such as a message indicating the component is unavailable for shipment or that the component was backordered together with a backorder shipping date, and information regarding an expected receipt date by which the component should be received.

When a replacement component is ordered, the order number, order date, item description, item number, printer name and printer location are stored in the order tracking database. At this time, an expected receipt date is calculated for the component and the expected receipt date is stored in the order tracking database. The expected receipt date may be a specific date or it may be a time period from the date the order was placed (e.g., six days from the order date, etc.).

When the component is received, a received date is stored in the order tracking database. The record for the component may then be purged or archived for later reference. The fact that the component was received must be entered into the order tracking system. This may be done manually or it may be accomplished semi-automatically, such as scanning a bar code of the received component.

If the replacement component is unavailable for shipping, this information is noted in the order tracking database and a message is sent to notify an appropriate authority so that remedial action may be taken. The message may be displayed on a display of the printing device or on a display of a host computer. The message may be transmitted to a network system administrator at a network location, or it may be transmitted to a remote location via a modem or some other communication channel.

If the replacement component is not immediately available but can be backordered, the printing device is notified that the component has been backordered for shipment on a backorder shipping date. This information is stored in the order tracking database and the expected receipt date is updated accordingly. At this time, the system determines if the updated receipt date is soon enough to avoid printing device down time. If the updated receipt date is later than desired, an appropriate message is generated and transmitted to a supervising authority.

If the expected receipt date passes before a received entry has been stored in the order tracking database, then an appropriate message is generated and transmitted to an authority capable of taking an action to avoid printing device down time.

BRIEF DESCRIPTION OF THE DRAWINGS

The present invention is illustrated by way of example and not limitation in the figures of the accompanying drawings. The same numbers are used throughout the figures to reference like components and/or features.

FIG. 2 is a diagrammatic representation of an order tracking database.

DETAILED DESCRIPTION

Figure 1:
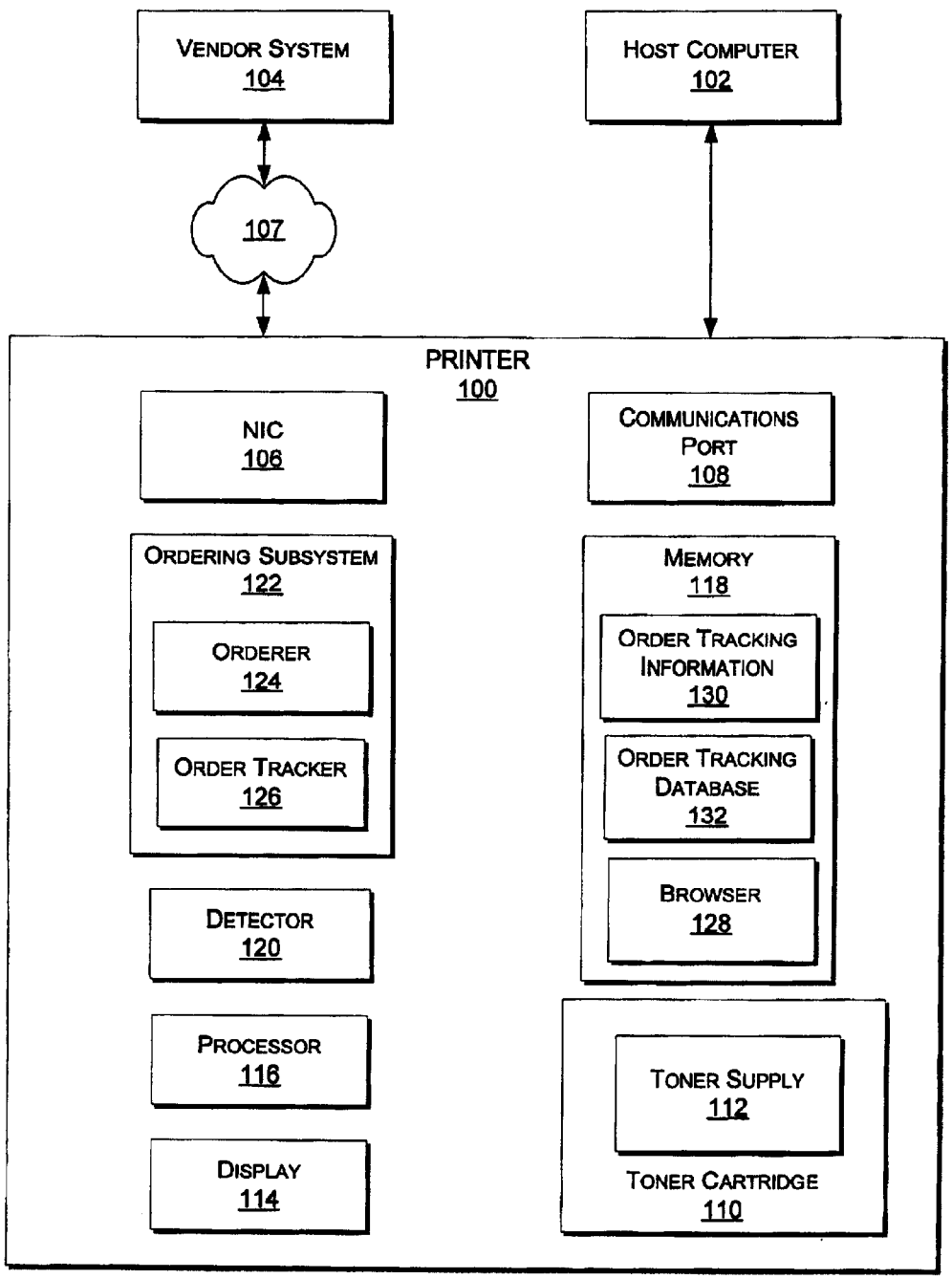
FIG. 1 is a block diagram of a laser printer having automatic order tracking capability.

The following description sets forth one or more specific implementations and/or embodiments of systems and methods for automatically tracking the order status of one or more printing device replaceable components ordered by an automatic ordering system. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods that automatically track the status of automatically ordered replaceable components for a printing device. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

Computer-Executable Instructions

An implementation of a system and/or method for automatically tracking the order status of an automatically ordered replaceable component for a printing device may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a system and/or method for automatic status tracking of automatically ordered printing device replaceable components may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile (or video) disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Automatic Tracking System

FIG. 1 is a block diagram of a laser printer 100 constructed in accordance with one implementation of the automatic tracking system described herein. Although the present discussion describes the laser printer 100, it is noted that the automatic tracking system described herein may be included with any type of printing device—such as an inkjet printer, a facsimile machine, a copy machine, etc.—that utilizes replaceable components and includes an automatic component ordering system. It will be recognized by those skilled in the art that many of the features shown in the laser printer 100 and/or the functions performed by those features may be implemented as software modules, hardware devices and/or a combination thereof.

Also shown in FIG. 1 is a host computer 102 that is connected to and communicates with the laser printer 100, and a vendor system 104 that communicates with the laser printer 100 and the host computer 102. The host computer 102 and the vendor system 104 are utilized with an automatic component ordering system as well as with the automatic tracking system described herein. The function of the host computer 102 and the vendor system 104 will become apparent as the automatic tracking system is described in greater detail below.

The laser printer 100 includes a network interface card (NIC) 106 and a communications port 108. The NIC 106 is configured to access and communicate with the vendor system 104 via the Internet 107 or some other network. The communications port 108 is a parallel port through which the laser printer 100 communicates with the host computer 102, although it could be any port to which the host computer 102 may be connected. In addition, the laser printer 100 could communicate with the host computer 102 via the Internet 107.

The laser printer 100 also includes a replaceable toner cartridge 110 that has a toner supply 112 stored therein. Although the present discussion will focus on the replacement of the toner cartridge 110, it is noted that the invention described herein is suitable for use related to any replaceable component that is used in the laser printer 100.

The laser printer 100 further includes a display 114, a processor 116 and memory 118. A detector 120 is included that is configured to detect when a replaceable component in the laser printer 100 is nearing or has reached the end of its functional life cycle. For the present discussion, the detector 120 is a low toner detector 120 that detects when the toner supply 112 of the toner cartridge 110 has reached a depletion level indicating that a replacement toner cartridge (not shown) should be ordered to replace the toner cartridge 110. The detector 120 is shown located in the laser printer 100 itself, although the detector 120 may be integrated into the toner cartridge 110.

An automatic ordering subsystem 122 in the laser printer 100 includes an orderer 124 and an order tracker 126. The orderer 124 is configured to receive a notice from the detector 120 that the toner supply 112 in the toner cartridge 110 is low. Upon receipt of the notice, the orderer 124 automatically contacts the vendor system 104 either by way of the Internet (107) using a browser 128 stored in the memory 118, or directly using a model (not shown). The orderer 124 may also contact the vendor system 104 indirectly through the host computer 102.

The order tracker 126 is further configured to receive order tracking information 130, which is stored in the memory 118. The order tracking information 130 includes, but is not limited to, a shipping date on which a component was shipped, a received date on which a component was received, unavailable information that indicates a component is unavailable for shipping, backorder information indicating that a component has been backordered for shipping on a backorder shipping date, etc. The order tracking information 130 may be stored individually in the memory 118, or it may be stored in an order tracking database 132 that is stored in the memory 118.

The features and functions of the laser printer 100 and its components will be described in greater detail, below. The following discussion pertains to details of the order tracking database 132. Unless noted otherwise, all processing of data stored in the order tracking database 132 is performed by the order tracker 126 of the ordering subsystem 122. Those skilled in the art, however, will recognize that processing of the order tracking database 132 may be performed by other elements of the laser printer 100.

Exemplary Data Structure

FIG. 2 is a representation of the order tracking database 132 shown in FIG. 1. The order tracking database 132 includes several records 202–214, each of which contains similar fields 216–234. For convenience of discussion, when referring to a particular field, reference will be made to the reference numerals of the record and the field, e.g. "(record, field)."

Record 202 of FIG. 2 shows the description of the value contained in each field 216–234. Record 204 and record 206 show specific examples of values that may be contained in each field 216–234. Although shown as containing field descriptions, record 202 is a normal record having values similar to those shown in record 204 and record 206. Also, each of the remaining records 208–214 are assumed to contain appropriate information, though none is shown in these records in FIG. 2. The order tracking database 132 may contain from one to several records and is not limited to the number of records shown in FIG. 2.

Each record contains the following values (description, field number):

order number, 216—An order number 216 is a number assigned to the order associated with a record, the order number 216 uniquely identifying the order within the ordering system. Typically, the orderer 124 of the ordering subsystem 122 assigns the order number when the order is placed. The order number 216 may be an internal value or it may represent an order number assigned by the vendor shipping the order.

order date, 218—An order date 218 is a date on which the order was placed with a vendor. The order date 218 is usually identified and stored in the order tracking database 132 by the orderer 124, although the order tracker 126 may be configured to store this number upon receipt of order information from the orderer 124.

item description, 220—An item description is stored in field 220 of each record and contains a short description of the ordered item, e.g., toner cartridge, fuser, drum, etc. This information is typically provided by the orderer 124.

item number, 222—An item number 222 is a number that uniquely identifies the ordered component. The item number 222 may be an internal number, but the item number 222 is more typically a model number assigned to the component by the component manufacturer.

printer, 224—A printer field 224 contains a value that uniquely identifies the printing device for which the replacement component was ordered. This value may typically be the printer name assigned by a host computer or network to which the printer is attached.

location, 226—A location field 226 identifies the location of the printing device identified in the printer field 224. The value in the location field may be a workgroup, an office number, a building and/or floor, a person's name, etc.

date shipped, 228—When an order is shipped by a vendor, the vendor transmits a message indicating a shipping date to the order tracker 126 of the ordering subsystem 122. The order tracker 126 then stores the shipping date in the date shipped field. In another implementation, the message from the vendor may simply indicate that the order was shipped, thus requiring the order tracker 126 to determine the date before it is stored in the order tracking database 132.

date received, 230—When the component associated with the record 202 is received, the order tracker 126 stores the date the order was received in the date received field 230. This step will, more than likely, require a minimal amount of human intervention, such as manually entering the information on a keyboard, or scanning the received order to obtain the information from a label or bar code. However, this step may be automated as well. For example, received orders may be placed on a conveyor belt when they are received. Information about the component may then be automatically scanned from a label as the component traverses the conveyor belt. This may, however, require a more sophisticated design wherein a shipping label contains enough specific information to properly identify the printing device destination.

The date received may be identified at the time the order information is input into the system, or the item number may be transmitted to the order tracker 126 where a date is assigned to the order. The order tracker 126 then stores the received date in the order tracking database 132.

other, 232—This field 232 is used to store miscellaneous information that does not normally get stored for each ordered component. For example, if the orderer 124 orders a component that is no longer available for shipment, the order tracker 126 receives this information and stores it in the order tracking database 132. As will be discussed in greater detail, below, the order tracker may then generate a warning message to notify an appropriate authority.

If the component is available but is backordered at the time the order is placed, the order tracker 126 stores this information in the other field 232, together with a backorder shipping date, if available, that indicates a date on which the component is expected to be available for shipping.

expected receipt date, 234—The order tracker 126 determines a date on which an order should be received and stores this date in the expected receipt date field 234. There are several ways in which the order tracker 126 can determine this date. For instance, the order tracker 126 may simply be configured to set an expected receipt date for a certain number of days after the order date 218. Alternatively, each particular item may have an expected receipt date 234 that is an offset period (number of days) after the order date (each component may have its own particular offset period). For example, it is relatively simple to estimate how many days there are between the time a toner low signal occurs with a toner cartridge and the time when the cartridge must be replaced. In this case, the offset period for such a toner cartridge may be the latest date on which the toner cartridge may be received to prevent printer down time. This may prevent false alarms when a toner cartridge is received after an expected receipt date calculated in another way, but before the replacement toner cartridge is absolutely necessary.

Specific examples of values that may be contained in the fields 216–234 of a record 202–214 are described in the following examples. Record 204 shows that a toner cartridge (204, 220) having an item number (204, 222) of "HP4500L" was ordered on "Dec. 12, 2000" (204, 218) for a printer identified as "PER03L" (204, 224) in the personnel department (204, 226). The order was assigned an order number (204, 216) of "142976" and an expected receipt date (204, 234) of "Dec. 20, 2000" was derived. Record 204 also indicates that this order was shipped on "Dec. 11, 2000" (204, 228) and was received on "Dec. 15, 2000" (204, 230). No information was stored in the "other" field (204, 232). No warning or error message was indicated for this order because the toner cartridge was received before the expected receipt date (204, 234).

Record 206 shows that a drum (206, 220) having an item number (206, 222) of "HPLJ5L" was ordered on "Dec. 12, 2000" (206, 218) for a printer identified as "ADMIN01L" (206, 224) in a location identified as "Building A, Floor 1" (206, 226). The order was assigned an order number (206, 216) of "142977" and an expected receipt date (206, 234) of "Dec. 22, 2000" was derived. Record 206 also indicates that this order has not yet been shipped (206, 228). However, the drum was backordered (206, 232) for shipment on Dec. 20, 2000. In this case, a warning message may be generated notifying an appropriate authority of the backorder. However, an alternative implementation may not generate a warning message in this instance, since the backorder shipping date (206, 232) precedes the expected receipt date (206, 234) and the order may still be received on schedule.

In one implementation, the expected receipt date (206, 234) may be altered by the order tracker 126 upon receipt of a backorder notice. However, this should only occur after an authority has been sent and has acknowledged a warning message. In this way, a printer user is made aware that the expected receipt date has slipped. If the new date is unacceptable, the printer user may take appropriate action.

In one implementation, the order tracker 126 may determine that the backorder shipping date (206, 232) on which the component is expected to ship may be unacceptable. In this instance, the order tracker 126 notifies the orderer 124 of this determination and the orderer 124 will cancel the backorder and will contact a different vendor to order the component.

The elements and reference numerals of FIG. 2 will continue to be referenced in the following discussion of FIG. 3.

Methodological Implementation of the Automatic Tracking System

Figure 3:
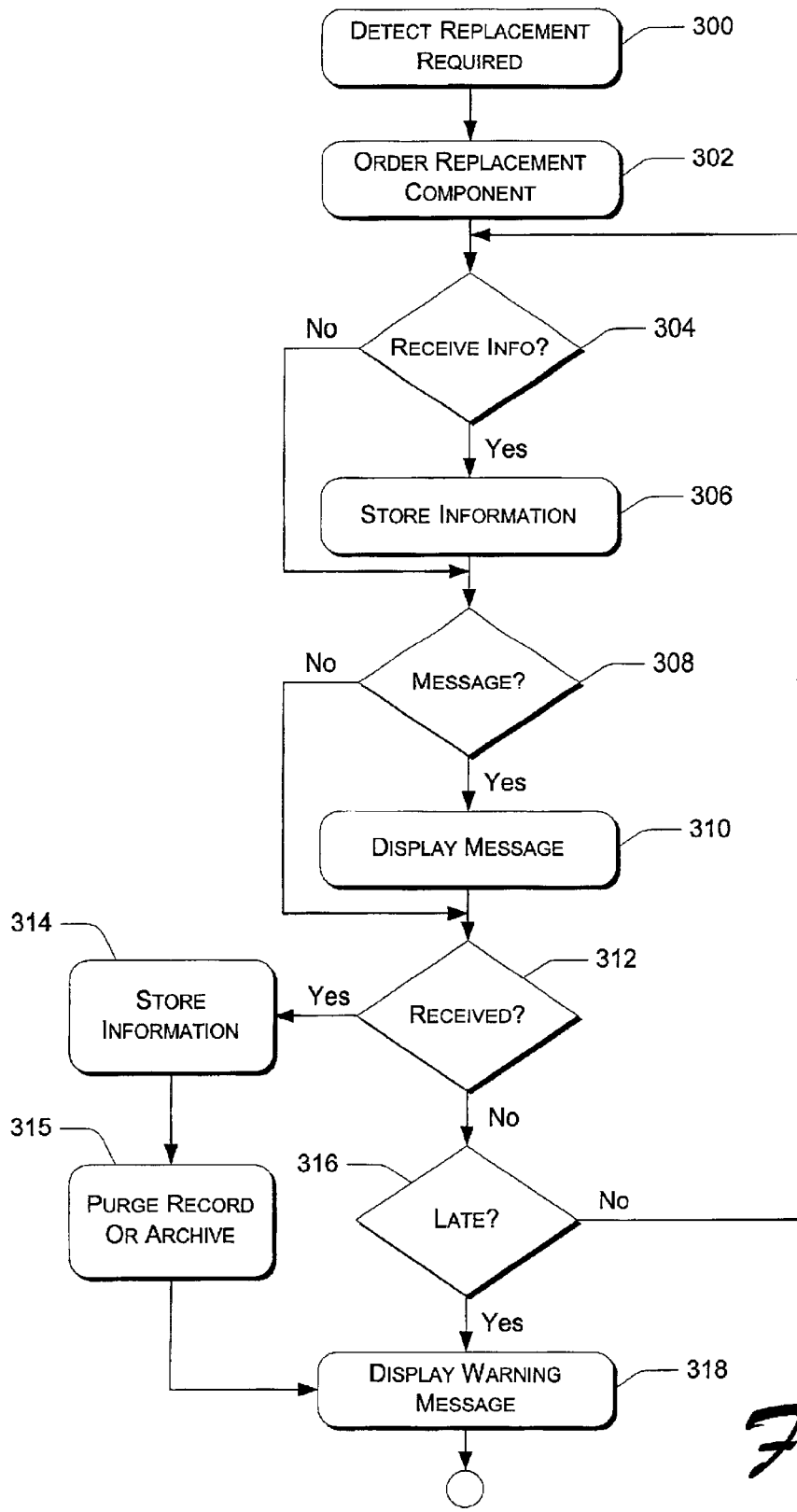
FIG. 3 is a flow diagram depicting a methodological implementation of an automatic order tracker.

FIG. 3 is a flow diagram depicting a methodological implementation of the automatic tracking system described herein. At block 300, the detector 120 detects that a replacement for the toner cartridge 110 of the laser printer 100 is required. For this specific example of a toner cartridge in a laser printer, this is typically in the form of a "low toner" signal. However, any printing device replaceable component may be used, if the replaceable component has a functional life cycle may reach a state (such as nearing depletion, depleted, etc.) wherein the detector 110 determines that a replacement component is required.

The orderer 124 of the automatic ordering subsystem 122 orders a replacement for the toner cartridge 110 at block 302. At this time, the order tracker 126 is ready to receive order tracking information 130 from an outside source, such as the vendor system 104. If the order tracker 126 receives order tracking information regarding the order ("Yes" branch, block 304), then the order tracker 126 stores the appropriate information in the order tracking database 132. If no order tracking information is received ("No" branch, block 304), the process continues at block 308, wherein it is determined if a situation exists that warrants a warning message be generated. For example, if information is received and stored (block 306) that indicates that an ordered component has been backordered, then a message is required ("Yes" branch, block 308) and displayed at block 310. Alternatively, the message may be transmitted to the host computer 102 or a network site (not shown) for display to an appropriate authority.

If the replacement component is received ("Yes" branch, block 312), then a received date 230 is stored in the order tracking database 132 at block 314. Since the order cycle is now complete, the record associated with the order is purged or archived for later reference at block 315.

If the replacement component has not been received ("No" branch, block 312), then it is determined if the replacement component that was ordered is late (block 316). This is accomplished by comparing the current date with the expected receipt date 234 in the order tracking database. If the current date is later than the received date 230, then the order is late ("Yes" branch, block 316), and a warning message is generated for delivery to an appropriate authority. This may be accomplished by displaying the warning message on the printer display 114, by transmitting the warning message to the host computer 102, by transmitting the warning message to an appropriate authority over a local area network, a wide area network or the Internet, etc. If the expected receipt date 234 is later than the current date, then the order is not late and the process reverts to block 304, wherein the order tracker is prepared to receive order tracking information.

Conclusion

Implementation of the automatic order tracking system described herein provides a safeguard to a printer user that an automatically ordered replaceable component for a printing device is received in a timely manner. The status tracking of component orders prevents undesirable down time of printing devices, thus saving a printer user time and money.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A printing device, comprising:
   a detector configured to detect when a first replaceable component needs to be replaced;
   an orderer configured to automatically order a second replaceable component to replace the first replaceable component; and
   an order tracker configured to receive order tracking information regarding the second replaceable component order.

2. The printing device as recited in claim 1, wherein the order tracker is further configured to store the order tracking information in an order tracking database.

3. The printing device as recited in claim 1, wherein the order tracking information further comprises a shipped date on which the second replaceable component was shipped.

4. The printing device as recited in claim 1, wherein the order tracking information further comprises a received date on which the second replaceable component was received.

5. The printing device as recited in claim 1, wherein the order tracking information further comprises an unavailable message that indicates that the second replaceable component is unavailable for shipment.

6. The printing device as recited in claim 1, wherein the order tracking information further comprises a backorder message that indicates that the second replaceable component is backordered for shipping on a backorder shipping date.

7. The printing device, as recited in claim 1, wherein the order tracker is further configured to initiate a warning message if the order tracker has not received order tracking information indicating that the second replaceable component has been received prior to an expected receipt date.

8. The printing device as recited in claim 1, wherein:
   the first replaceable component is a laser printer toner cartridge;
   the second replaceable component is a laser printer toner cartridge; and
   the detector is a toner low detector that indicates when toner contained in the first toner cartridge is nearing depletion.

9. One or more computer-readable media containing computer-executable instructions that, when executed on a computer, perform the following:
   receiving notice that a replacement printing device replaceable component should be ordered to replace a printing device replaceable component that is nearing or has reached the end of a functional life cycle;
   placing an order for the replacement replaceable component; and
   receiving order tracking information regarding the replacement printing device replaceable component order.

10. The one or more computer-readable media as recited in claim 9, further comprising storing the order tracking information.

11. The one or more computer-readable media as recited in claim 9, wherein the order tracking information further comprises a shipped date on which the replacement printing device replaceable component was shipped.

12. The one or more computer-readable media as recited in claim 9, wherein the order tracking information further comprises a received date on which the replacement printing device replaceable component was received.

13. The one or more computer-readable media as recited in claim 9, wherein the order tracking information further comprises an unavailable message that indicates that the replacement printing device replaceable component is unavailable for shipment.

14. The one or more computer-readable media as recited in claim 9, wherein the order tracking information further comprises a backorder message that indicates that the replacement printing device replaceable component is backordered for shipment on a backorder shipping date.

15. The one or more computer-readable media as recited in claim 9, further comprising initiating a warning message if the replacement printing device replaceable component has not been received prior to the occurrence of an expected receipt date.

16. The one or more computer-readable media as recited in claim 9, wherein the printing device replaceable component and the replacement printing device replaceable component are laser printer toner cartridges.

17. A laser printer that embodies the one or more computer-readable media as recited in claim 9.

18. A laser printer, comprising:
   memory;
   a processor;
   a replaceable component;
   a detector configured to detect when the replaceable component is at or nearing the end of a life cycle;
   an orderer configured to automatically order a replacement component for the replaceable component when the detector detects that the replaceable component is at or nearing the end of a life cycle; and
   an order tracker configured to receive order tracking information regarding the replacement component order.

19. The laser printer as recited in claim 18, further comprising an order tracking database stored in the memory, and wherein the order tracker is further configured to store the order tracking information in the order tracking database.

20. The laser printer as recited in claim 18, wherein the order tracking information further comprises a shipped date on which the replacement component was shipped.

21. The laser printer as recited in claim 18, wherein the order tracking information further comprises a received date on which the replacement component was received.

22. The laser printer as recited in claim 18, wherein the order tracking information further comprises an unavailable message that indicates that the replacement component is unavailable for shipment.

23. The laser printer as recited in claim 18, wherein the order tracking information further comprises a backorder message that indicates that the replacement component is backordered for shipment on a backorder shipping date.

24. The laser printer as recited in claim 18, wherein the order tracker is further configured to generate a warning message if the replacement component is not received by an expected receipt date.

25. The laser printer as recited in claim 18, wherein the replaceable component is a toner cartridge.

* * * * *